3,539,633
DI-HYDROXYBENZYL POLYAMINES
Edmund J. Piasek, Chicago, Ill., and Robert E. Karll, Munster, Ind., assignors to Standard Oil Company, Chicago, Ill., a corporation of Indiana
No Drawing. Filed Oct. 22, 1965, Ser. No. 502,368
Int. Cl. C07c 87/28, 91/28
U.S. Cl. 260—570.5     2 Claims

ABSTRACT OF THE DISCLOSURE

Novel high molecular weight alkyl-hydroxybenzyl N-substituted amines are those whose alkyl group has 50 to 20,000 carbon atoms and is mainly para substituted with respect to the hydroxy group of the hydroxybenzyl substituent on a nitrogen of the amine. Those high molecular weight alkyl-hydroxybenzyl N-substituted amines are prepared as products of the condensation of (1) high molecular weight alkyl substituted phenol, (2) a polyamino compound such as an alkylene polyamine or its condensation product with urea or thiourea in the respective molar ratio of 2:1, (3) formaldehyde, and (4) an alkyl-substituted phenol whose alkyl substituent has 2 to 20,000 carbon atoms used in the respective molar ratio for (1), (2), (3) and (4) of 1.0 to 1.5:1.0:1.5 to 2.0:0 to 0.5. Stable boron compound interaction products of such high molecular weight N-substituted amines are also novel products. Both the high molecular weight N-substituted amines and their boric acid interaction products are soluble in lubricant oil and in concentrations of those solutes in the range of 0.1 to 50 weight percent provide novel lubricant compositions.

---

This invention relates to hydroxybenzyl amines as novel compounds and more particularly pertains to novel hydroxy $C_{50}$ and higher alkylbenzyl substituted amines, their preparation and their use as a detergent-dispersant addition agent for lubricant oil formulation.

The compositions closest to those of the present invention are the di(alkyl hydroxybenzyl) substituted alkylene diamines obtained reacting $C_4$ to $C_{20}$ alkylphenols, formaldehyde and a diamino alkane in the ratio of two moles of said alkylphenol and two moles formaldehyde for each mole of diamino alkane of the formula $H_2N$—R—$NH_2$ where R is a divalent alkylene hydrocarbon. Such compounds have been previously illustrated by the following structural formula:

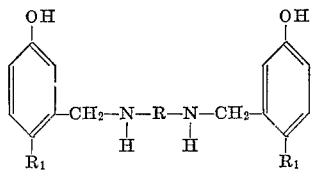

where R is said divalent alkylene hydrocarbon and $R_1$ is a $C_4$ to $C_{20}$ alkyl hydrocarbon group.

Another closely related class of alkyl hydroxybenzyl substituted polyamines are those resulting from the reaction of from 0.5 to 2 moles each of $C_4$ to $C_{20}$ alkyl phenol and formaldehyde for each basic nitrogen in an alkylene polyamine also named azaalkylene diamines. Said alkylene polyamines are those having the formula

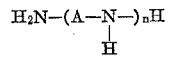

where A is divalent alkyl of 2 to 6 carbon atoms and $n$ is an integer of from 1 to 10. The alkylene polyamines usually used are the di-, tri- and tetra-ethylene tri-, tetra- and pentamines, that is A is —$CH_2CH_2$— and $n$ is 2, 3 and 4. The resulting products are illustrated in U.S. Pat. 3,036,003. For example the reaction of 3 moles each of p-tertiary octyl phenol and formaldehyde with one mole of diethylene triamine is illustrated as $N_1$, $N_2$, $N_3$-tri-(2-hydroxy-5-t.-octylbenzyl) diethylene triamine; the reaction of 2 moles each of p-t.-octyl phenol and one mole diethylenetriamine is illustrated as being either $N_1$, $N_3$-di-(2-hydroxy-5-t-octylbenzyl) or $N_1$, $N_2$-di-(2-hydroxy-5-t.-octylbenzyl) diethylene triamine. It would appear from this reference that the 2-hydroxy-5-alkyl-benzyl alcohol intermediate resulting from reaction of equimolecular ratios of alkylphenol and formaldehyde will react equally with either the primary amino (—$NH_2$) group or the secondary amino (—NH—) group whose nitrogen is part of the azaalkylene amine chain substantially without preference.

The hydroxy-$C_2$ to $C_{20}$ alkybenzyl substituted diaminoalkanes and alkylene polyamines of said closest prior art are prepared by reacting the alkylphenol, lower aliphatic aldehyde such as formaldehyde and acetaldehyde, and diaminoalkane or alkylene polyamine at 100 to 350° F. In the absence or presence of a solvent. When a solvent it used, benzene, toluene, xylene and others easily removed from the hydroxyalkylbenzyl substituted amine product, light mineral oil such as are used on blending stocks to prepare lubricant oil formulations and mixtures of these two types of solvents are those of choice. Since water is formed as a by-product, drying of the reaction mixture is accomplished by employing a reaction temperature sufficiently high, at least during part of the process, to drive off water alone, as an azeotropic mixture with the aromatic solvent, or to drive off water by the aid of an inert stripping gas such as nitrogen, carbon dioxide, etc. The hydroxy-$C_2$ to $C_{20}$ alkylbenzyl substituted diaminoalkanes and alkylene polyamines are generally prepared as lubricant oil additives and hence the preferred choice of solvents are the light mineral oils.

Also the hydroxy-$C_2$ to $C_{20}$ alkylbenzyl substituted diaminoalkanes and alkylene polyamines are used substantially only in the form of their exactly neutralized or highly basic (or over based) alkaline earth metal salts (alkaline earth metal phenate derivatives) to provide a combination of detergent-inhibitor properties in one additive agent. The exactly neutralized alkaline earth metal salts have one equivalent of alkaline earth metal for each hydroxy group present. The highly basic or over based alkaline earth metal salts have for each hydroxy group present more than one equivalent of alkaline earth metal in the form of a hydroxy metaloxy, alkoxy metaloxy and even alkaline earth metal carbonate complex with hydroxy metaloxy on each benzene ring as a replacement for the phenol hydroxy group. Certain of the hydroxy-$C_2$ to $C_{20}$ alkyl benzyl substituted alkylene polyamines are disclosed by U.S. Pat. 3,036,003 to be useful per se in lubricant oil formulations as ashless-type detergents. For example the tetra-(hydroxy-5.-octylbenzyl) substituted product resulting from the reaction of p-t.octyl phenol, formaldehyde and tetraethylene pentamine used in the mole ratio of 4:4:1, four moles each of the alkylphenol and formaldehyde for each mole of tetraethylene pentamine is shown in a carbon black suspension test to keep all (0.25 grams) of the carbon black suspended in a solvent prepared by mixing 25 milliliters each of kerosene and a mineral oil blend having a viscosity of 90 SSU at 210° F. However, in an oxidation stability test, the free tetra-(hydroxy - t. octylbenzyl)substituted tetraethylene pentamine alone (no other detergent) permitted sludge and varnish formation as well as oxidation of the base oil solvent. No demonstration of the detergency property of free tetra- (hydroxy-5.-octylbenzyl) substituted tetraethylene pentamine or any other ashless type product disclosed in U.S. Pat. 3,036,003 as the sole detergent in a lubricant oil formulation in actual engine crankcase lubrication is disclosed.

We have discovered that very effective dispersant-detergent-antioxidant hydroxy-alkylbenzyl substituted alkylene polyamines (azaalkylene amines) are obtained from $C_{50}$ and higher carbon content alkylphenols with formaldehyde and alkylene polyamines having the formula

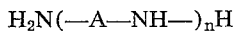

wherein R is a divalent saturated alkyl hydrocarbon radical having 2 to 6 carbon atoms and $n$ is an integer of from 1 to 10, preferably 2 to 10, suitably when there are used M moles alkylene polyamine, 1.5 to 2 M moles formaldehyde, 1.0 to 1.5 M moles of a $C_{50}$ or higher alkyl substituted phenol and 0 to 0.5 M moles of $C_2$ to $C_{50}$ and higher alkyl substituted phenol. Desirably there are used to prepare the hydroxy-alkylbenzyl substituted alkylene polyamines of this invention M mole of said alkylene polyamine, 1.0 to 1.5 M moles of $C_{50}$ and higher carbon content alkylphenol and 1.5 to 2 M moles formaldehyde. Preferably the compounds of this invention are those obtained from the use of M moles of said alkylene polyamine, 1.0 to 1.5 M moles of $C_{50}$ and higher carbon content alkylphenol, 1.5 to 2 M moles formaldehyde and 0 to 0.5 M mole $C_2$ to $C_{20,000}$ alkylphenol. The aforementioned hydroxy ($C_{50}$ and higher) alkylbenzyl substituted alkylene polyamines are also useful as lubricant addition compounds when reacted with a boron compound which forms a coordinate boron complex with polar groups present.

The foregoing hydroxyalkylbenzyl substituted alkylene polyamine products derived from $C_{50}$ and higher carbon content alkyl substituted phenols, their preparation and lubricant oils compositions containing said products are the subject matter of this invention. The foregoing N substituted alkylene polyamines derived from phenol having $C_{50}$ and higher carbon content alkyl hydrocarbon substituents are exceptionally useful detergent-dispersant antioxidant lubricant oil addition agents per se without converting their phenolic hydroxy groups to alkaline earth metal salts because the use of low concentrations of said substituted alkylene polyamines of this invention in lubricant oil crankcase formulations substantially prevents the formation and deposit of sludge and varnish in and on engine parts under most severe service in internal combustion tests. When the products of our invention are compared against the $N_1,N_2$-di-(hydroxy-$C_2$ to $C_{20}$ alkylbenzyl) ethylene diamines in standardized, industry accepted engine tests of lubricant oil formulations, said substituted ethylene diamines derived from $C_2$ to $C_{20}$ alkylphenols are wholly unacceptable for detergents and/or dispersant addition agents at the level to which they can be incorporated in lubricant oil. However, the products of this invention when used at the level of suitable 0.1 to 10.0 and preferably 0.5 to 5.0 weight percent in lubricant oil compositions used as crankcase lubricants in the same standardized, industry accepted engine tests results in over-all sludge and varnish rating of 40 and over, even 45 to 49.5 (an over-all rating of 50 for sludge and varnish means a clean engine free from detectable sludge and varnish).

The di-(hydroxy-$C_2$ to $C_{20}$ alkylbenzyl) substituted diaminoalkanes and poly-(hydroxy-$C_2$ to $C_{20}$ alkylbenzyl) substituted alkylene polyamines hereinbefore described as prior art compounds closest to the products of this invention are prepared by heating a mixture or solution containing the $C_2$ to $C_{20}$ alkylphenol and diaminoalkane or alkylene polyamine in the desired molar ratios to a temperature above 100° F. and generally below 200° F. and then an amount of formaldehyde or formaldehyde yielding material such as formalin, paraformaldehyde and trioxymethylene, is added slowly to provide a molar proportion of formaldehyde equivalent to the alkylphenol. Thereafter the reaction is conducted at 200 to 250° F. for about one hour and then by-product water is removed.

According to the process of this invention equimolecular proportions of $C_{50}$ and higher up to about 20,000 carbon content substantially alkyl hydrocarbon substituted phenols, formaldehyde and alkylene polyamine having the formula HN—(—A—NH—)$_n$H wherein A is a saturated divalent alkyl hydrocarbon having 2 to 6 carbon atoms and $n$ is an integer of from 1 to 10, preferably 2 to 10, are heated in the presence or absence of a solvent suitably to a temperature in the range 100 to 200° F. for 1 to 3 hours and then heated to and maintained at suitably 130 to 300° F. Thereafter at least 0.5 mole and preferably 1.0 mole of formaldehyde or 1.0 mole of formaldehyde and 0.5 mole of a $C_2$ to $C_{50}$ and higher alkylphenol per mole of starting $C_{50}$ and higher carbon hydrocarbon alkylphenol are added at 150 to 200° F. and the resulting mixture heated to and maintained at suitably 250 and 350° F. for one to 5 hours while by-product water is removed. The dried product is filtered to remove any insoluble material present. The preferred $C_{50+}$ alkyl phenols are those having a number average molecular weight in the range of from 800 to 2500. Although the theoretical amount of formaldehyde necessary to convert the first step 1:1:1 product to the substituted amines products containing the 2:2:3 mole ratio alkylphenol to alkylene polyamine to formaldehyde of this invention is only 0.5 mole formaldehyde per mole of $C_{50+}$ alkylphenol starting material it is preferred to use more than 0.5 mole formaldehyde e.g. 1.0 mole formaldehyde, per mole $C_{50+}$ alkylphenol starting material to insure completion of reaction to form the 2:2:3 product of the structure hereinafter illustrated. The excess formaldehyde is either driven off later or reacts with a secondary nitrogen resulting in a methylol substituent of said secondary nitrogen.

Suitable alkylene polyamine reactants include ethylenediamine, diethylene triamine, triethylene tetramine, tetraethylene pentamine, pentaethylene hexamine, hexaethylene hepta-amine, heptaethylene octamine, octaethylene nonamine, nonaethylene decamine and decaethylene undecamine and mixtures of such amines having nitrogen contents corresponding to the alkylene polyamines where A is divalent ethylene and $n$ is 3 to 10 of the foregoing formula. Corresponding propylene polyamines such as propylene diamine and di-, tri-, tetra-, penta-propylene tri-, tetra- and penta-amines are also suitable reactants. The alkylene polyamines are usually obtained by the reaction of ammonia and dihalo alkanes, such as dichloro alkanes. Thus the alkylene polyamines obtained from the reaction of 2 to 11 moles of ammonia with 1 to 10 moles of dichloro alkanes having 2 to 6 carbon atoms and the chlorines on different carbons are suitable alkylene polyamine reactants.

Formaldehyde per se need not be used as a reactant in the process of this invention. Suitable formaldehyde yielding sources of formaldehyde such as aqueous and alcohol solutions of formaldehyde, paraformaldehyde and trioxymethylene can be used as well as formaldehyde per se to provide the moles thereof for the purposes of this invention.

The $C_{50}$ and higher carbon content substantially alkyl hydrocarbon substituted phenols are obtained by the alkylation in the presence of $BF_3$ of phenol with $C_{50}$ and higher carbon content polypropylenes, polybutenes, copolymers of propylene with monomers copolymerizable therewith wherein the copolymer molecule contains at least 90% propylene units, copolymers of butenes (butene-1, butene-2 and isobutylene) with monomers copolymerizable therewith wherein the copolymer molecule contains at least 90% butene units. Said monomers copolymerizable with propylene or said butenes need not be hydrocarbon monomers for they can contain polar groups such as chloro, bromo, keto, ethereal, aldehydo and other polar groups. The comonomer polymerized with propylene or said butenes need not be aliphatic and can also contain non-aliphatic groups as are styrene, α-methyl styrene, α,p-dimethyl styrene, divinyl benzene and the like. From the foregoing limitation placed on the monomer copolymerized with propylene or said butenes, it is abundantly clear that said polymers and copolymers of propylene and said butenes are substantially aliphatic hydrocarbon polymers. Thus the resulting alkylated phenols are $C_{50}$ and higher carbon content substantially alkyl hydrocarbon substituted phenols.

The boron coordinate complex derivatives of the substituted amines of this invention have a boron to nitrogen (B/N) weight ratio suitably in the ratio of 0.01 to 3 (about 0.01 to 4.0 equivalents of boron per equivalent of nitrogen), desirably 0.01 to 1.0 and preferably 0.05 to 0.5. These coordinate complexes should be stable boron coordinate complexes as hereinafter defined and are prepared as hereinafter disclosed and demonstrated.

The aforementioned $C_{50}$ and higher carbon content substantially alkyl hydrocarbon substituted phenols and their preparation is not part of this invention but rather is the invention described and claimed in our copending application Ser. No. 484,758, filed Sept. 2, 1965.

For the purposes of this invention the size of the $C_{50}$ and higher carbon content substantially alkyl hydrocarbon substituent of the phenol reactants are in the range of $C_{50}$ to $C_{20,000}$. The $C_{20,000}$ alkylphenols are obtained for example by alkylating phenol with butyl rubber of 350,000 number average molecular weight.

Since the products of this invention are ultimately for use in preparing lubricant oil formulations it is advantageous to use light mineral oil, e.g. from white mineral oils to solvent extracted SAE 10 grade oils as the reaction solvent and recover the hydroxy $C_{50+}$ substantially alkylbenzyl substituted alkylene polyamines dissolved in said mineral oil solvents in concentrations of 40 to 70 weight percent. This is readily accomplished by using solutions of the $C_{50+}$ substantially alkylphenol dissolved in light mineral oil of from white mineral oil to SAE 10 grade oil. The examples which follow illustrate the preparation of products of this invention.

PREPARATION A

To prepare N-mono-$C_{55}$ alkylbenzyl tetraethylene pentamine there is used an alkylphenol (mainly p-alkyl) of number average molecular weight (NAMW) of 890 (average of 55 carbons in alkyl groups) obtained by alkylating phenol with a polypropylene having about 60 carbon atoms. The alkylation product contains 80 percent by weight of said 890 NAMW alkylphenol and 200 grams provide 0.18 mole of the 890 NAMW alkylphenol. A mixture of 200 grams (0.18 mole) 80% of 890 NAMW alkylphenol and 34 milliliters (0.18 mole) tetraethylene pentamine is stirred and heated to 210° F. and then 5.4 grams formalin (37% CH$_2$O) is added to provide 0.18 mole formaldehyde. The temperature of the reaction mixture increased to 300° F. Nitrogen at 1.5 (c.f.h. cubic feet per hour (measured at 77° F.) and atmospheric pressure is injected into the resulting reaction mixture at 320 to 340° F. for five hours. The resulting product is a light colored liquid. By analysis this product has a number average molecular weight of 1237, contains 4.46% nitrogen, 2.58% oxygen and has a 210° F. viscosity of 2466 SSU (Saybolt Seconds Universal). This product contains the N-mono-$C_{55}$ alkylbenzyl tetraethylene pentamine resulting from the reaction of $C_{55}$ alkylphenol, formaldehyde and tetraethylene pentamine in the mole ratio of 1:1:1, i.e. equimolecular proportions of the three reactants.

The $C_{50}$ and higher alkyl benzyl substituted amines of this invention have a single —CH$_2$ group on their benzene rings in a position ortho to the hydroxy group substituent. This is clearly indicated by the strong 12.1 micron band indicative of the unsubstituted 5 and 6 ring positions. Infrared analysis of the first step product obtained from the use of equimolecular proportions of $C_{50}$ and higher alkylphenol, polyalkylene polyamine and formaldehyde also show a strong 12.1 micron band indicative of no substituents on the 5 and 6 ring positions. Thus the first step product clearly has the formula

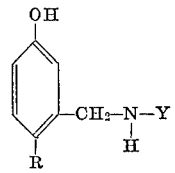

wherein R is the $C_{50}$ to $C_{20,000}$ alkyl hydrocarbon group and Y is

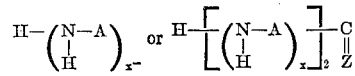

wherein A and $x$ are as hereinbefore defined and Z is oxygen or sulfur. These first step compounds containing

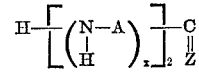

are prepared from bis-carbamides and bis-thio carbamides (Z is O and S, respectively) of polyalkylene polyamines which in turn are derived from the reaction of two moles of polyalkylene polyamine with one mole of urea or thio area, respectively, with the liberation of two moles ammonia.

The product of the second reaction step derived from the reaction of the first reaction step with additional formaldehyde have not been conclusively defined with respect to structure other than the above strong 12.1 micron infrared band indicative of retention of unsubstitution in the 5 and 6 ring positions. This would exclude the formation in the second reaction step with additional formaldehyde of products having a methylene bridge linking two moles of first reaction step product through 5 and/or 6 ring position carbons in each mole. The second reaction step formaldehyde might react with the secondary amino groups of

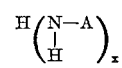

but there is a strong indication that the formaldehyde used in the second step reacts with at least one of the terminal primary amino groups to form a —NH—CH$_2$OH terminal group as an intermediate. Such a —NH—CH$_2$OH terminal group can react with a hydrogen of the other terminal primary amino group or it can react with the hydrogen on a 6 position carbon (the —OH group still retains its stronger ortho directing character). In either condensation reaction water is the by-product. Where the second reaction step product involves reaction between formaldehyde and hydrogens of both terminal primary amino groups of Y, such a product can be called a "tail-to-tail" product. Where the formaldehyde of the second reaction step reacts with one hydrogen of one terminal primary amino group to provide a N-(hydroxymethyl) substituent whose hydroxy reacts with a 6 hydrogen splitting out by-product water, the final product can be called a "tail-to-head" product. Where a p-alkylphenol is also present in the second reaction step it appears somewhat certain that the second stage formaldehyde reactant present in the proportion of 2 moles formaldehyde per mole of second stage reactant alkylphenol, reacts at two ortho positions of said second stage p-alkylphenol reactant and the 2,6-methylol groups react with one hydrogen each of the two terminal primary amino groups to form a tail-to-head-to-tail condensation product with the second stage p-alkylphenol moiety appearing in the central position of the molecule, i.e. the final product is symmetrical with respect to the second stage alkylphenol moiety.

The foregoing C$_{50}$ and higher alkyl benzyl substituted amine products can be illustrated by the following formulae:

Formula I: Tail-to-Tail

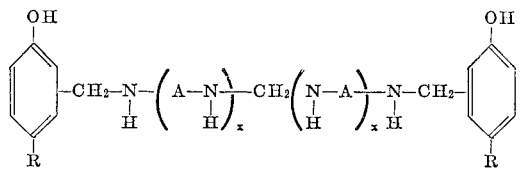

Formula II: Tail-to-Head

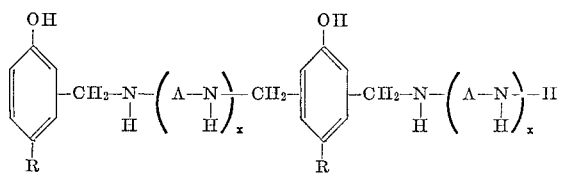

Formula III: Tail-to-Head-to-Tail

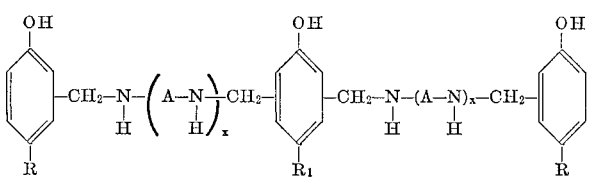

Formula IV: Tail-to-Head-to-Tail

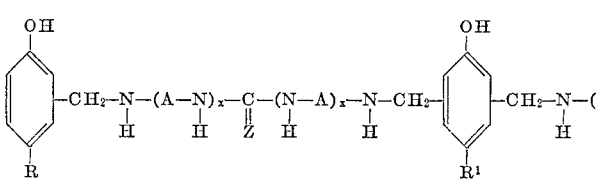

Formula V: Tail-to-Tail

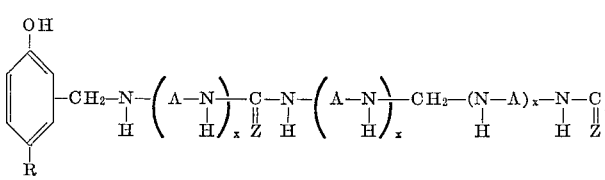

Formula VI: Tail-to-Head

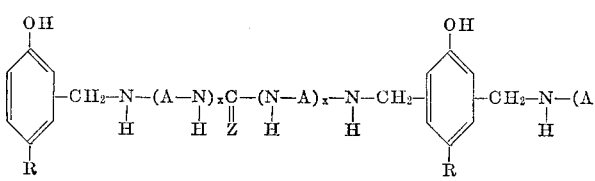

Wherein A is a saturated divalent alkyl hydrocarbon group of 2 to 8 carbon atoms, $x$ is 1 to 10, Z is oxygen or sulfur, R is an alkyl hydrocarbon group of from 50 to 20,000 carbon atoms, and R$_1$ is an alkyl hydrocarbon group of from 2 to 20,000 carbon atoms. Also part of this invention are boron compound interaction product of compounds having the Formulae I, II, III, IV, V and VI and such boron compounds as boric acid, boron oxide, boron halides and esters of boron acids. Such boron compound derivatives (sometimes referred to as boron coordinate complexes) are more properly boron compound interaction products for the reasons hereinafter appearing.

It is known that boron halides such as boron trifluoride, boron triiodide and boron trichloride can form an interaction product with phenolic hydroxy groups, i.e. hydroxy group substituents on a benzene ring. It has also been demonstrated that boron oxide, boron oxide hydrate, boron trifluoride, boron triiodide, boron tribromide, boron trichloride, boric acid, boronic acids (such as alkyl-B-(OH)$_2$ and aryl-B-(OH)$_2$), tetraboric acid, metaboric acid and esters of boric acids form interaction products with other polar groups such as the primary and secondary amino (—NH$_2$ and —N—H) groups as well as phenolic hydroxy groups. Ethers, organic acids, inorganic acids or hydrocarbon complexes with boron halides can be used as convenient means for introducing the boron compound as a reactant into the oil solutions of the hydroxyalkylbenzyl substituted amine products of this invention. More specifically in place of the aqueous solution of boric acid, DMF solution of boric acid and oil slurry of boric acid used in the examples hereinbefore set forth, there can be used boron trifluoride-diethyl ether complex, boron trifluoride-phosphoric acid complex, boron trichloride-chloroacetic acid complex, boron tribromide-diozane complex, boron trifluoride-methyl ethyl ether complex.

The boron reactant when introduced as a boronic acid can be methylboronic acid, phenylboronic acid, cyclohexylboronic acid, p-octylphenylboronic acid, decylboronic acid and the like. The boron reactant when introduced as an ester of boric acid can be mono-, di- and tri-esters of derived by a means well known to the chemist by reacting one mole boric acid or tetraboric acid with such hydroxy compounds as alkanols, alkylene diols, cycloalkanols and the like. There esters of boric acids can be used to replace boric acid reactant illustrated in the examples hereinbefore set forth.

Since the boron reactant can form an interaction product with any or all of the polar groups, the phenolic hydroxy, the secondary amino and primary amino groups present in compounds having structural Formulae I, II, III, IV, V and VI hereinbefore set forth, it is not known with certainty which of the polar groups are involved in the formation of the interaction product. It is not essential for the purposes of this invention for the boron compound reactant to form an interaction product with one or more particular polar groups present as long as a stable boron compound interaction product forms. By "stable boron compound interaction product" is meant that one can be heated at least to 300–350° F. and filtered at 300–350° F. without substantially completely removing boron from the solute in the filtrate. It is desirable to have B/N ratios (weight ratio of boron to nitrogen) in the range of 0.01 to 1.0 and preferably in the range of from 0.05 to 0.5, present in the solute hydroxyalkylbenzyl substituted amines of this invention. Such boron interaction products when used in lubricant oil formulations provide better anti-corrosion and/or anti-wear protection especially when alkaline earth metal salts of alkylbenzenes sulfonite acids, e.g. calcium or magnesium $C_{15}$ to $C_{20,000}$ alkyl substituted benzene sulfonic acids are also employed as addition agents.

Example 1

The product of Preparation A is stirred and cooled to 200° F. and 5.4 grams formalin (37% $CH_2O$) providing 0.18 mole formaldehyde is added. Thereafter this mixture is stirred and heated to 340° F., held at 340° F. while injecting nitrogen at 1.5 c.f.h. for five hours. The resulting product is clear, dark and viscous. This product has a 210° F. viscosity of 14,515 SSU and by analysis has 3.14 weight percent oxygen and 4.14 weight percent nitrogen. The N-substituted amine product produced by the foregoing reaction is illustrated by substituting in structural Formulae I and II $C_{55}$ alkyl for each R and $(HNC_2H_4)_4$ for each $(A-NH)_n$. This compound has a number average molecular weight of about 2196 and has 5.1 percent by weight nitrogen. The product of Example 1 has 40 grams diluent, mainly residue non-reactive polypropylene from the alkylation, and thus the 4.14 percent nitrogen by weight of the product corresponds to about that of 0.09 mole of the foregoing substituted amine product with the 40 grams diluent.

An amount of the product of Example 1 containing 0.5 gram of the disubstituted amine shown is added to a measured volume of crankcase lubricant oil formulation which had been used in a Lincoln Sequence V engine test for 385 hours (twice the time of the standard test time). To the same volume of used crankcase oil from the same 394 hour Lincoln Sequence V engine test there is added 0.5 gram $N_1$, $N_5$-bis(polybutenylsuccinimide) of tetraethylene pentamine (Bis-Succinimide) whose polybutenyl group has a molecular weight of about 860. These two compositions are heated and stirred at 300° F. for 16 hours and an aliquot of each is transferred to blotting paper. A control is made at the same time by stirring and heating at 300° F. for 16 hours a third volume of used oil from the 394 hour Lincoln Sequence V engine test and depositing an aliquot on blotting paper. The remainder of each treated used crankcase oil (control=no addition agent) is permitted to stand and the time is measured for the substantially complete separation of oil from sludge. The deposits on the blotting paper are measured to obtain the average diameter of the outer oil ring (Do) and the average diameter of the inner sludge ring (Ds). The ratio of Ds/Do is an indication of the detergent-dispersant property of the addition agent. These ratios and the sludge settling tests are shown in Table I.

TABLE I.—USED LINCOLN SEQUENCY V OIL—394 HOURS

| Test | Addition agent | Sludge settling | (×100) ratio Ds/Do |
|---|---|---|---|
| 1, Control | No | About one minute | About 60. |
| 2 | Example 1, 0.59 | 95 minutes | 89. |
| 3 | Bis succinimide 0–59 | 19 minutes | 82.5. |

Example 2

The process of Example 1 is repeated by heating and stirring 1000 grams (0.9 mole) of 1110 NAMW alkylphenol (alkyl group derived from polypropylene) and 170 milliliters (0.9 mole) tetraethylene pentamine (TEPA) to 200° F. and then adding formalin to provide 0.90 mole formaldehyde. Thereafter this mixture is heated to 300° F. with nitrogen injection at 1.0 c.f.h. during nitrogen injection the temperature increased to 350° F. and held at this temperature for 10–15 minutes and then dropped to 320° F. at the end of 2 hours nitrogen injection. The resulting product, a clear liquid, is diluted with 1200 grams SAE 5 oil (40 weight percent of the 1:1:1 reaction product). The oil diluted product is cooled to 200° F. and 0.9 mole formaldehyde is added with stirring. This mixture is heated to 340° F. and held at 340° F. while injecting nitrogen at 1.0 c.f.h. for about 3 hours. The resulting product is filtered through celite at about 300° F. The resulting filtrate is a light colored, crystal clear product. The filtrate at 210° F. has a viscosity of 147.7 SSU and is found to contain 2.25 percent nitrogen and 1.66 percent oxygen, both by weight. The substituted amine product is a 2 mole alkylphenol:2 mole TEPA:3 mole formaldehyde compound of the type shown for Example 1.

Lubricant oil formulations are prepared containing 2.0% and 1% by weight of this hydroxy alkylbenzyl substituted tetraethylene pentamine product in a manner analogous to that shown for Example 1. The 2.0% concentration of Example 2 substituted amine oil formula is tested in the crankcase of a Ford V8 289 cubic inch displacement engine and the 1.0% concentration of Example 2 substituted amine oil formulation is tested in a Lincoln Sequence V engine test and a L–38 engine test for bearing corrosion. The latter two engine tests have been long established and accepted standardized tests. The Ford 289 engine test is conducted similar to the Lincoln Sequence V engine test. Details of these test conditions hereinafter appear.

Example 3

The are combined 1000 grams of an SAE 5 oil solution having 35 per cent NAMW 892 alkylphenols (alkyl group from polypropylene) by weight (0.392 mole alkylphenol) and 0.392 mole TEPA. This mixture is stirred and heated to 210° F. and 32 milliliters formaldehyde (0.32 mole) are added slowly permitting the temperature of the reaction mixture to increase to about 240° F. The resulting mixture is heated to 340° F. and nitrogen is injected at 1.0 c.f.h for 90 minutes. The final temperature is 320° F. This mixture is stirred and cooled to 180° F. and an additional 32 milliliters formaldehyde are added increasing the reaction temperature to 200° F. At this temperature 40.9 grams (0.55 mole) boric acid (ratio of 0.4B to 1.0N) is added and the resulting mixture is stirred and heated to 330° F., held at this temperature with nitrogen injection at 1.0 c.f.h. for 10 hours. The resulting hazy reaction mixture is filtered. The filtrate, a clear liquid is analyzed for nitrogen and boron. The nitrogen content is 1.7 percent and boron content is 0.16 percent, both by weight. From the boric acid charged, complete reaction with the nitrogen present in the substituted amine from the mole ratio of 2 alkylphenol:2 TEPA:3 formaldehyde would be about 1% by weight in the final product.

Example 4

The method of Example 2 is repeated using a 47% by weight solution of NAMW 900 alkylphenol (alkyl is from polypropylene) in SAE 5 oil to provide 0.85 mole of alkylphenol, 0.85 mole TEPA and two (69 ml.) portions of formalin (37% $CH_2O$) to provide 0.85 mole formaldehyde at each addition. The resulting filtered product is a dark, bright and clear liquid having viscosities of 352 SSU at 210° F. and 12,677 SSU at 100° F. By analysis this liquid product is found to contain on a weight basis 2.88% nitrogen, 1.2 oxyqen, and 52% of the substituted amine product (like the structure depicted in Example 1) from the 2 mole NAMW 900 alkylphenol:2 mole TEPA:3 mole formaldehyde reactant mole ratio.

Example 5

There are combined 100 grams 2220 NAMW alkylphenol (0.045 mole), 100 grams SAE 5 oil and 0.045 mole TEPA. This mixture is stirred and heated to 187° F. and 0.045 mole formaldehyde is added. This liquid mixture is stirred and heated to 320–340° F. and nitrogen is injected at 1 c.f.h. for 2 hours. Thereafter the liquid mixture is stirred and cooled to 200° F., a second addition of 0.045 mole formaldehyde is made and then the liquid mixture is stirred and heated again to 320–340° F. with nitrogen injection at 1 c.f.m. for about 3 hours. The resulting liquid is filtered at about 300° F. through celite. The filtrate is light in color, bright and clear liquid having a 210° F. viscosity of 2720 SSU. By analysis this product contains on a weight basis 0.85% nitrogen, 0.82% oxygen and about 40% of the 2 mole 2200 NAMW alkylphenyl:2 mole TEPA:3 mole CH$_2$O mole ratio substituted amine product of the structure like that shown in Example 1.

Example 6

There are combined, stirred and heated to 180° F., a solvent extracted SAE 5W oil solution containing 2.38 millimoles of alkylphenol obtained by alkylating phenol with a 70,000 NAMW polybutene (solution has a 100° F. viscosity of 38,880 SSU) and 2.38 millimoles TEPA. Then two additions of 2.38 millimoles formaldehyde are made at 140° F. and 160° F., respectively, with heating to 300–320° F. and 1 c.f.h. nitrogen injection after each formaldehyde addition. By this method a very high molecular weight substituted amine product of 2 mole alkylphenol:2 mole TEPA:3 mole formaldehyde of the structure shown in Example 1 can be obtained.

Example 7

There are combined, stirred and heated to 160° F. 820 grams of 1800 NAMW alkylphenol (alkyl group derived from polybutene) providing 0.365 mole of said alkylphenol, 820 grams solvent extracted SAE 5W oil and 0.3 to 5 mole TEPA. Then 0.365 mole formaldehyde is added, the reaction mixture is stirred and heated to 320° F., held at 320° F. for 90 minutes and nitrogen is injected at 1.5 c.f.h. at 260° F. for one hour. The liquid mixture is stirred and cooled to 180° F. and a second 0.365 mole formaldehyde addition is made, the resulting liquid reaction mixture is stirred and heated to 320° F., held at 320° F. for 90 minutes and nitrogen at 1 c.f.h. is again carried out at 260° F. This liquid is filtered through celite at about 260° F. The 210° F. viscosity of the filtrate is 687 SSU, and, by analysis, is found to contain 0.531% oxygen, 1.4% nitrogen, a total base number (TBN) of 30.61 and contain 42.5% of the 2 mole 1800 NAMW alkylphenol:2 mole TEPA:3 mole formaldehyde mole ratio substituted amine of the structure like that shown in Example 1.

Example 8

There are combined, stirred and heated to 170° F. 700 grams solvent extracted SAE 5 oil, 0.284 moles TEPA and 966 grams of 2358 NAMW alkylphenol (alkyl group from polybutene) providing 0.284 mole of acid alkylphenol. Then 0.284 mole of formaldehyde is added, the mixture heated to 320–340° F. and held at 320–340° F. for 2 hours while injecting nitrogen at 2.0 c.f.h. An additional 0.284 mole of formaldehyde is added to the liquid cooled to 180° F. and this liquid mixture is heated to 340° F., held at 340° F. for 2 hours while injecting nitrogen at 2 c.f.h. The liquid product is filtered. The filtrate has a 210° F. viscosity of 1191 SSU and is found to contain 1.13 percent nitrogen by weight. In this manner there is produced a solvent extracted SAE 5W oil solution of the 2 mole 2358 NAMW alkylphenol:2 mole TEPA:3 mole formaldehyde mole ratio substituted amine of a structure like that illustrated in Example 1.

Example 9

There are combined, stirred and heated to 170° F., 630 grams solvent extracted SAE 5 oil, 0.29 mole TEPA and 700 grams of 1836 NAMW alkylphenol (alkyl group from polybutene of 124 average carbons) to provide 0.29 mole of alkylphenol. Thereafter 0.29 mole formaldehyde is added, the liquid mixture is stirred and heated to 320° F., held at 320° F. for 2 hours while injecting nitrogen at 2 c.f.h. Then 0.15 mole of p-nonylphenol is added, the resulting mixture stirred and cooled to 180° F. and a second addition of 0.29 mole formaldehyde is made. The resulting liquid mixture is stirred and heated to 340° F., held at 340° F. for 2 hours while injecting nitrogen at 2 c.f.h. The resulting liquid solution is filtered. The filtrate is a bright clear liquid having a 210° F. viscosity of 1018 SSU and is found by analysis to contain 1.4% nitrogen by weight and have a 33.02 TBN. The solute dissolved in the SAE 5W solvent extracted oil has the structure of compounds (III) and (IV) where C$_{124}$ alkyl is substituted for each R, C$_9$ alkyl is substituted for R$_1$ and CHNC$_2$H$_4$ is substituted for each (A—NH)$_n$ and thus is of the type of 2 mole C$_{50+}$ alkylphenol:2 mole TEPA:1 mole C$_9$ alkylphenol:4 mole CH$_2$O substituted amine comprising products of this invention.

Example 10

The process of Example 8 is repeated using 0.31 mole each of TEPA and 1937 NAMW alkylphenol (alkyl group from polybutene and has average of 131 carbons) as a 34 weight percent solution in SAE 5 oil. Two 0.31 mole CH$_2$O portions are added at 180° F. with heating to 320° F. and nitrogen injection for 40 minutes after first addition and 150 minutes after second addition. The filtrate is a clear, bright liquid of light color having a 210° F. viscosity of 931 SSU, a 26.44 TBN and containing 1.2 percent nitrogen by weight. The product solute of 2 mol C$_{131}$ alkylphenol:2 mole TEPA:3 mole CH$_2$O mole ratio is of a structure like illustrated in Example 2.

Example 11

In this preparation, bis-carbamide of TEPA, i.e. the compound

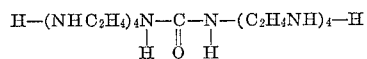

derived by reacting 2 moles TEPA with one mole urea to split out two moles ammonia is employed in place of TEPA. There is employed 0.031 mole of said bis-carbamide of TEPA, 0.031 mole of 1713 NAMW alkylphenol (alkyl group from polybutene) dissolved in SAE 5W oil (143 grams of solution) and two 0.031 mole portions of CH$_2$O each added at 180° F. with heating to 320° F. for 90 minutes and 1.5 c.f.h. nitrogen injection after each addition. The resulting liquid product is filtered. The filtrate is a solution of the 2 mole 1713 NAMW alkylphenol:2 mole bis-carbamide of TEPA:3 mole CH$_2$O mole ratio substituted amine of the structure of Formulae V and VI where C alkyl is substituted for each R, (HNC$_2$H$_4$)$_4$ is substituted for each (A—NH)$_n$ and Z is oxygen.

The use of bis-carbamide of polyalkylene polyamines, i.e. having the generic formula

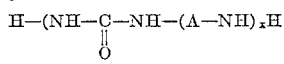

wherein $x$ and A are the integer and divalent alkylene hydrocarbon hereinbefore defined, in place of the polyalkylene polyamine is a convenient means for introducing nearly the same number of nitrogens in the product of 2 moles C$_{50+}$ alkylphenol:2 moles polyalkylene poly amine:3 moles CH$_2$O by the use of a lower nitrogen lower molecular weight polyalkylene polyamine starting material in place of a higher nitrogen a molecular weight polyalkylene polyamine. In fact said bis-carbamides are useful replacements for TEPA. Also by the use of said bis-thiocarbamides wherein sulfur replaces oxygen in the generic formula hereinbefore shown, the sulfur provides extreme pressure lubricant properties to the detergent-dispersant oxidation inhibiting compounds of this invention.

Example 12

As an example of such a sulfur-containing dispersant-detergent oxidation inhibiting compound of this invention, there are reacted 0.32 mole of thiourea and 0.64 mole of diethylene triamine to produce 0.32 mole bis-thiocarbamide of diethylene thiamine:

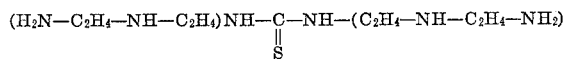

under conditions splitting out two moles ammonia. Then this 0.32 mole of this bis-thiocarbamide is combined with 1088 grams of 1836 NAMW $C_{124}$ alkylphenol (described in Example 9) to provide 0.32 mole of $C_{124}$ alkylphenol. After stirring and heating this mixture to 140° F. there is added 0.32 mole formaldehyde, this mixture is heated to 340° F., held at 340° F. while injecting 2.2 c.f.h. nitrogen for 75–80 minutes, cooled to 200° F., an additional 0.32 mole $CH_2O$ is added, and the resulting liquid is stirred and heated to 340° F. and nitrogen at 2.2 c.f.h. is injected at 340° F. for 2 hours. The resulting mixture is filtered.

The detergency-dispersancy activity of the products of Examples 11 and 12 exceeds that of corresponding products prepared from TEPA or diethylene triamine (DETA) by more than the mere difference in nitrogen atom content might suggest. It will be appreciated that biscarbamide (0.29 mole) derived from DETA can be used in place of 0.29 mole TEPA with the 0.29 mole $C_{124}$ alkylphenol and 0.15 mole p-nonylphenol and two 0.29 mole portions formaldehyde in the process of Example 9 to produce a related product as solute in SAE 5 oil wherein said solute there are present two

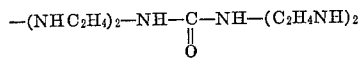

in place of the two TEPA moieties shown in the 1-hydroxy-4-nonyl-m-xylyl-$N_5$,$N'5$-bis ($N_1$-3-$C_{124}$ alkyl-6-hydroxy benzyl TEPA).

Example 13

Three preparations of 2 mole $C_{50+}$ alkylphenol:2 mole TEPA:3 mole formaldehyde products are carried out using 37 weight percent 1937 NAMW alkylphenol, 37 weight percent 1713 NAMW alkylphenol and 35 weight percent 1937 NAMW alkylphenol each in SAE 5W oil as source of the $C_{50+}$ alkylphenol reactant. These preparations are hereinafter identified as 13A, 13B and 13C, respectively. The sequence of steps, conditions and amounts of reactants is set forth in Table II for these three preparations.

c.f.h. nitrogen is injected for 5 hours. The resulting liquid is filtered at 300° F.

The 300° F. filtrate, a clear-bright liquid, is cooled to 250° F. under a nitrogen gas blanket and then 9.5 grams boric acid slurried in 20 grams SAE 5 oil is added. The resulting mixture is held at 250° F. for 60 minutes, is then heated to 300° F. and held at 300° F. with nitrogen injection at 2 c.f.h. for 60 minutes. The resulting solution of borated product solute in SAE 5 oil is filtered through celite at about 300° F. The filtrate is a bright liquid showing no Tyndall effect upon directing reflected diffused light into the filtrate. By analysis it is found that the filtrate contains 1.08% nitrogen and 0.04% boron, all by weight. Only one-fifth of the boron charged is in the product.

Example 15

There are combined, stirred and heated to 120° F. 334 grams of 33 weight percent 1900 NAMW (0.058 mole) alkylphenol in SAE 5W oil and 0.058 mole of bis-carbamide derived from TEPA. Then 0.058 mole $CH_2O$ is added, the mixture is heated to 200° F. and an additional 0.058 mole $CH_2O$ is added 45 minutes after the first addition. The mixture is stirred and heated to 270° F., held at 270° F. for 2 hours with 1.5 c.f.h. nitrogen injection. The liquid product is filtered at 270° F.

To 250 grams of filtrate there is slowly added 3.14 grams boric acid dissolved in 10 ml. dimethylformamide to minimize frothing by DMF boiling. This mixture is heated to 340° F. and 2 c.f.h. nitrogen is injected for 60 minutes. The liquid product is bright and clear. DMF appears to promote the interaction of boric acid with the free amino groups. The liquid product is filtered. The filtrate is a bright clear liquid having 0.25% boron and 0.83 nitrogen as determined by analysis.

When the foregoing process is repeated, the liquid reaction mixture became crystal clear in 30 minutes at 320° F. after addition of the DMF solution of boric acid.

Example 16

There are combined 0.217 mole TEPA and 1250 grams of 33 weight percent 1900 NAMW alkylphenol dissolved in SAE 5 oil to provide 0.217 mole of that alkylphenol and the mixture is stirred and heated to 120° F. The first 0.217 mole $CH_2O$ is added at 120° F., nitrogen is injected at 2 c.f.h. for 30 minutes, the mixture is heated

TABLE II

| Process Steps | 13A | 13B | 13C |
|---|---|---|---|
| (1) Combine, stir and heat. | 0.35 mole each TEPA and alkylphenol | 0.54 mole each TEPA and alkylphenol | 0.45 mole each alkylphenol and TEPA. |
| (2) Add $CH_2O$ | 0.35 mole at 160° F | 0.54 mole at 160° F | 0.45 mole at 160° F. |
| (3) Heat to 320° F. and hold with $N_2$ injection. | 1.5 hours and 1.5 c.f.h. $N_2$ | 1.5 hours and 1.5 c.f.h. $N_2$ | 1.5 hours and 1.5 c.f.h. |
| (4) Cool and add $CH_2O$. | 0.35 mole at 180° F | 0.54 mole at 180° F | 0.45 mole at 180° F. |
| (5) Repeat step (3) | 1.5 hours and 1.5 c.f.h. $N_2$ | 1.5 hours and 1.5 c.f.h. $N_2$ | 1.5 hours and 1.5 c.f.h. $N_2$. |
| (6) Filter | At 300° F | At 300° F | At 300° F. |

Small samples of 13A, 13B and 13C filtrates are taken and the remainder of 13A, 13B and 13C are combined and stirred. This mixture of 13A, 13B and 13C is hereinafter referred to as "Example 13 Composite Product" and is found to have a 210° F. viscosity of 780 SSU and a 29.88 TBN.

Example 14

There are combined, stirred and heated to 180° F. 0.482 mole TEPA and 2500 grams of 33% by weight 1713 NAMW alkylphenol in solvent extracted SAE 5W oil to provide 0.482 mole of said alkylphenol. Then 0.482 mole $CH_2O$ is added and the liquid mixture is stirred and heated to 340° F. and held at that temperature for 105 minutes while injecting nitrogen at 2 c.f.h. Thereafter the liquid reaction mixture is cooled to 180° F., an additional 0.482 mole formaldehyde is added and the resulting liquid is stirred and heated to 340° F. while 2 to and held at 220° F. for 105 minutes, then cooled to 200° F. at which temperature the second addition of 0.217 mole $CH_2O$ is made and the reaction temperature is raised to 220° F. and there held for 2 hours. Thereafter 16 grams boric acid dissolved in 25 grams water is added at 200° F. by means of a dropping funnel. Then the reaction temperature is increased to 300° F. and held there for 90 minutes with 2 c.f.h. nitrogen injection. The liquid product is filtered. The clear bright filtrate is found, by analysis, to contain 0.16% boron and 1.07% nitrogen by weight.

Example 17

There are combined, stirred and heated to 140° F. 0.058 mole diethylene triamine and 306 grams of a 38% solution of 2000 NAMW alkylphenol (0.058 mole) in white oil. A first addition of 0.058 mole formaldehyde is made and the mixture is heated to 220° F. and held at 220° F. for 60 minutes. Thereafter the mixture is cooled to 200° F. and the second addition of 0.058 mole formaldehyde is made. The mixture is stirred and heated to 300° F. and held at that temperature for 2 hours. There is no evidence of unreacted formaldehyde or amine. The liquid product is filtered. The filtrate, a light and clear liquid has a 210° F. viscosity of 1531 SSU, a specific gravity of 0.8996 at 77° F. and from analysis is found to contain 0.67% nitrogen by weight.

By substituting 0.058 mole bis-carbamide derived from DETA in the foregoing reaction, a liquid product of 1.3 to 1.5% nitrogen by weight may be obtained.

Example 18

There are combined, stirred and heated to 140° F. 0.477 mole DETA and 2500 grams of a 38% solution of 2000 NAMW alkylphenol (0.475 mole) in SAE 5W oil. A first addition of 0.475 mole formaldehyde is made and the mixture is stirred and heated to 220° F. The second addition of 0.475 mole formaldehyde is made 45 minutes later at 220° F., i.e. the reaction mixture is not cooled. The resulting liquid reaction mixture is then stirred and heated to 300° F., held at 300° F. for 2 hours and filtered at about 300° F. The filtrate, a light clear liquid has a 210° F. viscosity of 1418 SSU a specific gravity of 0.8967 at 77° F. and, by analysis, has 0.71% nitrogen by weight.

Example 19

There are combined, stirred and heated to 140° F. while injecting 2 c.f.h. nitrogen, 0.48 mole TEPA and 2500 grams of solution containing 33% by weight 1713 NAMW alkylphenol is SAE 5W oil. The first addition of 0.48 mole formaldehyde is made and the liquid mixture is heated to 220° F. while stirring and nitrogen injection is continued for 105 minutes. The liquid reaction mixture is cooled to 200° F., the second addition of 0.48 mole formaldehyde is made and the liquid mixture is heated to 220° F. with continued stirring and nitrogen injection for 105 minutes. Thereafter a solution of 32 grams boric acid in 76 grams water heated to 210° F. is added dropwise to the stirred liquid reaction product still at 220° F. After the aqueous solution of boric acid is added, the reaction temperature is increased to 300° F. and held at 300° F. for 90 minutes with continued stirring and nitrogen injection. The resulting oil solution of borated reaction product is filtered at 300° F. The filtrate is a clear, bright liquid and by analysis is found to contain 0.17% boron and 1.05% nitrogen, both by weight. The weight ratio B/N in said product is 0.16.

Example 20

There are combined, stirred and heated to 210° F., 0.18 mole of 890 NAMW alkylphenol and 0.09 mole of bis-carbamide derived from TEPA. The first addition of 0.18 mole formaldehyde is made and the resulting mixture is stirred and heated to 300° F. with 1.5 c.f.h. nitrogen injection. In 15 minutes the reaction temperature increased from 300 to 380° F., external heating is stopped and the reaction mixture became quite clear. In 4.5 hours no further heat of reaction is evolved. A filtered sample of the liquid product has a 210° F. viscosity of 5357 SSU and by analysis, is found to contain 4.33% nitrogen and 3.47% oxygen but is a hazy liquid.

A 100 gram sample of the foregoing liquid containing 0.09 mole reaction product is cooled to 200° F. and 0.18 mole formaldehyde is added and the mixture is stirred and heated to 380° F. while nitrogen at 2 c.f.h. is injected. The liquid is held at 380 to 400° F. for 3 hours and the liquid reaction mixture is observed to increase in clarity over the 3 hour reaction period. The solution of reaction product is filtered. The filtrate has a 210° F. viscosity of 5899 SSU and by analysis, has 3.98% nitrogen and 3.71% oxygen. The solute reaction product is that resulting from the mole ratio of 2 moles alkylphenol and 6 moles formaldehyde to the 10 equivalents of nitrogen in the bis(TEPA) carbamide. Other of the solute reaction products hereinbefore prepared on a 2:2:3, alkylphenol:TEPA:formaldehyde respectively, on the foregoing basis were products of 2 mole alkylphenol and 3.0 mole formaldehyde for the 10 equivalents of nitrogen in TEPA (2 moles).

Example 21

There are combined, stirred and heated to 140° F. with nitrogen injection at 1.5 c.f.h., a solution of 33% alkylphenol of 1713 NAMW (0.159 mole) in SAE 5W oil and 0.159 mole TEPA. The first addition of 0.159 mole formaldehyde is made, the reaction temperature is increased to 320° F. and held there for 90 minutes with continued stirring and nitrogen injection. The reaction mixture is cooled to 160° F. and the second addition of 0.159 mole formaldehyde is made and 11.5 grams boric acid crystals are also added. This mixture is stirred and heated to 300° F. under a nitrogen atmosphere and held at 300° F. until no solid boric acid can be seen. Thereafter nitrogen is injected at 1.5 c.f.h. until water is substantially removed. The filtered solution of reaction product is found by analysis to have 1.11% nitrogen and 0.18% boron, both by weight. The solute reaction product has a B/N weight ratio of 0.16.

Example 22

There are combined, stirred and heated to 140° F., a solution (250 grams) containing 38% of 1713 NAMW alkylphenol (0.482 mole) in SAE 5W oil and 0.482 TEPA. The first addition of 0.482 mole formaldehyde is made, the reaction mixture is stirred and heated to 300° F. with nitrogen injection at 1.5 c.f.h. for 60 minutes, cooled to 160° F. for the second addition of 0.482 mole formaldehyde and then stirred and heated again to 300° F. with nitrogen injection at 1.5 c.f.h. for 60 minutes. The liquid reaction mixture, SAE 5W oil solution of reaction product, has a 210° F. viscosity of 766 SSU and is found by analysis to have 1.25% nitrogen and a 31.4 TBN.

Example 23

There are combined, stirred and heated to 140° F., 2700 grams of solution of 1713 NAMW alkylphenol (0.58 mole) in SAE 5W oil and 0.58 mole TEPA. At 140° F. the first addition of 0.58 mole formaldehyde is made and the mixture is stirred and heated to 200° F. while injecting nitrogen at 1.0 c.f.h. for 60 minutes and then the second 0.58 mole formaldehyde addition is made at 200° F. with no nitrogen injection. This mixture is heated to 260° F. with nitrogen injection and stirring for 3 hours at 260° F. Thereafter a slurry of 63 grams boric acid in 50 grams SAE 5W oil is added with no nitrogen injection but while stirring the resulting mixture under a nitrogen blanket atmosphere. The oil solution-boric acid slurry is stirred and heated to 300° F. and held at 290 to 300° F. for 60 minutes while injecting nitrogen at 1.0 c.f.h. The resulting SAE 5W oil solution of reaction product is filtered at 320° F. The filtrate is found by analysis to contain 0.16% boron and 1.12% nitrogen (B/N weight ratio of 0.14) and has a 210° F. viscosity of 1700 SSU.

Example 24

The process of Example 24 is repeated using 2990 grams of 37.2% by weight 1900 NAMW alkylphenol (0.58 mole), 0.58 mole TEPA, two additions of 0.58 mole each of formaldehyde, and 43 grams boric acid slurried in 50 grams SAE 5W oil. The filtrate has a 210° F. viscosity of 1766 SSU and is found by analysis to contain 0.08% boron and 1% nitrogen with a weight ratio of B/N of 0.08.

Example 25

The process of Example 24 is repeated using 2255 gallons of 46% by weight 1750 NAMW alkylphenol (4.32 pound moles), 376 gallons SAE 5W oil, 98 gallons (4.42 pound moles) TEPA, two additions of 350 pounds formalin (37% $CH_2O$) to provide 4.32 pound moles formaldehyde at each addition, 200 pounds boric acid slurried in 100 gallons SAE 5W oil at 250° F., and 50 gallons SAE 5W oil at 250° F. to wash boric acid slurry transfer line into the reactor. The filtrate obtained from such a process typically has a 210° F. viscosity in the range of 800 to 900 SSU and contains about 40 weight percent borated reaction product dissolved in SAE 5W oil (40% product-60% oil by weight), 1.18 to 1.22% nitrogen by weight, 0.09 to 0.11% boron by weight and a B/N ratio of 0.075 to 0.085.

The screening detergent-dispersant test using crankcase drain oil from a Lincoln Sequence V engine test hereinbefore described is carried out with some of the products of the examples of 2 through 25. There is shown in Table III the product used identified by example number, the amount of reaction product in grams (not grams of solution produced) and the ratio of Ds (average diameter of sludge ring) to Do (average diameter of oil ring)×100.

novel substituted amine products of this invention can be easily blend mixed with base oils and oil solution concentrates of the aforementioned addition agents having antiwear, anti-corrosion, viscosity-index improving, anti-foam, etc. properties in transfer line blending, i.e. each concentrate and base oil are charged to a transfer line from sources of supply of each concentrate in the required proportions so that there flows from the transfer line a completely finished, fully formulated lubricant oil composition ready for packaging in quart, gallon, 5 quart, 30 gallon or 55 gallon containers or tank car and/or truck for delivery to the ultimate consumer. Such finished and fully formulated lubricant oil compositions are useful as crankcase lubricants for automobile, truck and railway gasoline and/or diesel engines.

The aforementioned Lincoln Sequence V engine test, Ford 289 engine test and L-38 engine test are conducted in the following manner.

TABLE III.—RING RATIO DETERGENT-DISPERSANT SCREENING TEST

| Example | Control | 2 | 4 | 5 | 7 | 11 | 2 | 9 | 13[1] | 13[1] | 13A | 18 | 20 | 10 | 14 |
|---|---|---|---|---|---|---|---|---|---|---|---|---|---|---|---|
| Grams | None | 0.5 | 0.4 | 0.5 | 0.5 | 0.28 | 0.25 | 0.23 | 0.26 | 0.5 | 0.28 | 0.5 | 0.25 | 0.56 | 0.56 |
| Ds/Do×100 | 60 | 92.5 | 87 | 89 | 97 | 77.5 | 71.5 | 76.7 | 79.4 | 90 | 84.3 | 88.4 | 89 | 93.8 | 91.5 |

[1] Composite of Example 13.

The same test procedure conducted with 2:1:2 mole ratio products, i.e. 2 moles phenol:1 mole TEPA:2 moles $CH_2O$, typical prior art products when made from 830 NAMW alkylphenol, 1140 NAMW alkylphenol have $Do/Ds \times 100$ ratios of 72 and 74, respectively at use of 0.5 gram. Those made from 2 moles of alkylphenol having 2 to 20 carbons in the alkyl substituent such as nonylphenol:1 mole TEPA and 2 moles formaldehyde do not have a sufficiently oil soluble alkyl R group substituent on the ring of the hydroxy benzyl group of the di and poly(hydroxyalkyl benzyl) amines to disperse sludge and hence show little or no improvement over the control.

The effectiveness of the substituted amine products of this invention as detergent-dispersant addition agent for lubricant oil compositions can be demonstrated by their use in such compositions as crankcase lubricants in actual engine tests such as the Lincoln Sequence V engine test, the Ford 289 engine test and the L-38 engine test aforementioned.

It will be noted that the hydroxyalkyl benzyl substituted amine products of this invention used in said tests unlike hydroxyalkyl benzyl substituted amines of the prior art are not used as their calcium, barium, magnesium or other alkaline earth metal or alkali metal salts.

The compounds of this invention can function as detergent-dispersant addition agents in lubricant oil compositions in the weight percent range suitable of from 0.1 to 10%, desirably in the range of 0.2 to 8.0% and preferably in the range of 0.5 to 5%. However, lubricant oil solutions having 10 to 50% or more by weight of the novel hydroxy-alkyl benzyl substituted polyalkylene amines of this invention including the bis(polyalkylene amine) carbamides and thiocarbamides are useful in the preparation of finished lubricant oil compositions because they can be readily and conveniently combined with concentrates of other lubricant oil addition agents such as oil solutions of the alkaline earth metal sulfonates, e.g. normal and high based calcium and magnesium salts of petroleum sulfonic acids such as sour oil, mahogany acid and alkyl substituted benzene sulfonic acids having alkyl hydrocarbon groups of a carbon content of greater than 16 and more specifically of 30 to 20,000 carbon atom alkyl hydrocarbon group size, oil solutions of zinc dialkyldithiophosphates and other concentrate solutions of lubricant addition agents all of which are used for their anti-wear, anti-corrosion, anti-foam, oxidation inhibition, oiliness, viscosity-index improving properties. For example, the oil solution concentrates having 10 to 50% by weight of the

LINCOLN SEQUENCE V ENGINE TEST

Briefly, this test designed to evaluate dispersancy characteristics of formulated lubricant oils consists of using the oil to be tested as a lubricating oil in a V-8 Lincoln engine under prescribed test conditions. Accordingly, five quarts of oil are placed in the crankcase and the engine is started and run in accordance with the four hour cycle:

| | Phase 1 | Phase 2 | Phase 3 |
|---|---|---|---|
| Duration | [1] 45 | [2] 2 | [1] 75 |
| Speed, r.p.m | 500 | 2,500 | 2,500 |
| Load, lbs | [3] | [4] | [4] |
| Temperature, °F.: | | | |
| Water out | 115–120 | 125–130 | 170–175 |
| Oil sump | 120–125 | 175–180 | 205–210 |
| A/F | 9.5±0.5 | 15.5±0.5 | 15.5±0.5 |

[1] Minutes.
[2] Hours.
[3] No load.
[4] 105 H.P.

The four-hour cycle is reset a total of 48 times (192 hours running time). After each 16 hours of operation the engine is shut down for 8 hours. Two-ounce samples of oil are taken every 30 hours and the oil level is adjusted with fresh oil to a level of five quarts. Added oil is weighed. At the time of the test, the hot oil is drained, weighed and recorded. The engine is then disassembled and tested for deposits of varnish and sludge among other observable results as set out in the table below. Engine components are examined visually and rated on a scale of 1 to 10, 10 being a perfect reading indicating no sludge or varnish. A rating of 50 for total sludge and for total varnish is considered perfect; a rating of 60 percent or lower is considered passing for screen clogging; and a rating of 50 percent or lower is considered passing for ring plugging.

FORD–289 ENGINE TEST

The Ford 289 cubic inch displacement engine test, hereinafter designated as "F-289 Test," is conducted in the same manner as the Lincoln Test Sequence V except for the apparent difference in test engines. This F-289 Test is more severe with respect to both sludge and varnish formation and deposition. Also the F-289 Test is conducted with vapors from the crankcase being introduced into the engine fuel intake system by means of a positive crankcase ventilation system which, in part, results in the more severe sludge and varnish formation during test operation.

L-38 ENGINE TEST

The "L-38 Engine Test" is also known as "CLR L-38 Engine Test" and is designed to evaluate high temperature oxidation stability of the formulated lubricant oil and such evaluation is based on piston varnish deposit and copper-lead bearing corrosion. In this test a single cylinder water cooled Labeco oil test engine is operated at 3150 r.p.m. for 40 hours with the test oil formulation. The oil is maintained at 300° F. and cooling water is maintained at 195° F. Cooper-lead connecting rod bearings are weighed before and after the 40 hour test. Bearing weight loss (BWL) of 50 milligrams or less is desired. After the 40 hour test the piston is visually evaluated and a varnish value is assigned by comparison to varnish deposit pictorial standards having assigned values of 1 to 10 for the color and extent of varnish deposit. In this varnish value scale of 1 to 10, the value 10 represents a clean and varnish free piston and the value 1 represents a substantially complete dark varnish coated piston. To qualify as a premium oil additive the varnish value should be 9.0 and above.

The following lubricant formulations in which all "percent" of the addition agent indicated are by volume, are prepared for use in the foregoing engine tests. Products of this invention are identified by reference to the appropriate example of preparation and the volume percent solution produced. The weight percent of the solute product or dissolved is that the "active ingredient," i.e. the dissolved substituted amine product, is shown under "weight percent." Where used "Ca-300" and "Mg-300" designate the respective sulfonates dissolved as concentrates in SAE 5W oil with a total base number of 300 for the solution and other higher or lower numbers designate higher or lower solution total base numbers. The designation "ZOP" is used to identify a zinc dialkyldithiophosphate and anti-wear-anti-corrosion addition agent whose alkyl groups are derived from the conjoint reaction of three different alcohols, two of which are primary alcohols such as $C_5$ and $C_{10}$ oxo-derived alcohols and the third is a secondary alcohol such as isopropyl or isobutyl alcohols, with dithiophosphoric acid and the total moles of the three alcohols is the stoichiometric amount required to obtain dialkyl dithiophosphoric acid for reaction with zinc or zinc oxide. Thus the "ZOP" is a statistical mixture of zinc salts having the three aforementioned alcohol derived alkyl groups. Since the relative proportions of $C_3$ iso, $C_8$ primary and $C_{10}$ primary alcohols can be varied considerably to provide an oil-soluble zinc salt, their precise proportions need not be indicated.

A "ZOP" product typical of that used is a concentrate zinc dialkyl dithiophosphate in SAE 5W oil having the following typical properties: Solution has 210° F. viscosity of 67 SSU, 5% Zn, 8% P and 16% S, all by weight. Formulations XIV and XVII use prior art type hydroxyalkylbenzyl substituted amines and are presented for comparison.

TABLE IV.—TEST OIL FORMULATIONS

| Formulation Number | Example Number | Vol., percent | Weight, percent | Percent ZOP | Percent Ca-300 | Percent Mg-300 | Percent base oil |
|---|---|---|---|---|---|---|---|
| I | 2 | 2.5 | 1.0 | 0.82 | 0 | 1.0 | 95.68 |
| II | 2 | 2.5 | 1.0 | 1.0 | 0 | 1.0 | 95.5 |
| III | 4 | 5 | 2.0 | 1.0 | 1.0 | 0 | 93 |
| IV | 7 | 2.5 | 1.0 | 1.0 | 0 | 1.0 | 95.5 |
| V | 7 | 5.0 | 2.0 | 1.0 | 1.0 | 0 | 93 |
| VI | 24 | 5.2 | 2.08 | 0.62 | 0 | 0 | 94.18 |
| VII | 13 | 4.0 | 1.6 | 1.0 | 1.0 | 0 | 94 |
| VIII | 13 | 5.0 | 2.0 | 1.0 | 0 | 0 | 94 |
| IX | 13 | 2.5 | 1.0 | 1.0 | 0 | 1.0 | 95.5 |
| X | 22 | 5.0 | 2.0 | 0.62 | 0 | 1.0 | 93.38 |
| XI | 19 | 5.0 | 2.0 | 0.62 | 0 | 0 | 94.38 |
| XII | 16 | 2.5 | 1.0 | 0.62 | 0 | 1.0 | 95.88 |
| XIII | 16 | 5.0 | 2.0 | 0.85 | 0 | 2.0 | 92.15 |
| Comparative XIV | (¹) | 5 | 2.0 | 1.0 | 0 | 0 | 94 |
| Comparative XV | (²) | 5 | 2.0 | 1.0 | 0 | 0 | 94 |
| Comparative XVI | (³) | 5 | 2.0 | 1.0 | 0 | 0 | 94 |
| Comparative XVII | (¹) | 6 | 2.4 | 1.0 | 3.0 | 0 | 90 |

¹ Product from 2 moles 830 NAMW alkylphenol:2 moles $CH_2O$:1 mole TEPA made in SAE 5W oil.
² Product from 1140 NAMW alkylphenol:4 moles $CH_2O$:1 mole TEPA made in SAE 5W oil.
³ Product from 1140 NAMW alkylphenol:2 moles $CH_2O$:1 mole TEPA made in SAE 5W oil.

The results of using above formulations in the Lincoln Sequence V Engine Test are presented in Table V.

TABLE V.—LINCOLN SEQUENCE V ENGINE TEST RESULTS

| | Sludge | Varnish | Percent oil ring Plugging |
|---|---|---|---|
| Formulation No.: | | | |
| I | 37 | 38 | 21 |
| IV | 46 | 42 | 0 |
| VI | 50 | 48 | 0 |
| IX | 46 | 48 | 0 |
| IX ⁴ | 39 | 42 | 0 |
| XII | 41 | 38 | 0 |
| XIV | 37 | 35 | 5 |
| XV | 34 | 31 | 43 |
| XVI | 39 | 42 | 2 |

⁴ Results from 384 hour test run which is twice as long as standard test.

The results of the use of the indicated formulations in the Ford-289 Engine Test are given in Table VI.

TABLE VI.—FORD-289 ENGINE TEST RESULTS

| | Sludge | Varnish | Percent Oil Ring Plugging |
|---|---|---|---|
| Formulation No.: | | | |
| V | 50 | 40 | 0 |
| VII | 45 | 37 | 0 |
| VIII | 40 | 39 | 0 |
| XIII | 48 | 43 | 0 |
| XVII | 32 | 28 | 0 |

The results from the CLR L-38 Engine Test using the formulations indicated are given in Table VII.

TABLE VII.—CLR L-38 ENGINE TEST RESULTS

| | Piston varnish | Bearing weight loss-mg. |
|---|---|---|
| Formulation No.: | | |
| II | 9.5 | 32 |
| VI | 9.8 | 35 |
| X | 9.5 | 57 |
| XI | 9.8 | 45 |

Lubricant oil formulations prepared from other of the products of this invention when used in the foregoing engine tests in the same or higher amounts of active ingredient will provide for the obtention of the same or superior results.

In general, the active ingredient product of this invention obtained as solute in light mineral oil have structural formulae as hereinbefore shown.

What is claimed is:

1. A method of preparing hydroxyalkylbenzyl substituted amines which comprises the first step reaction of equimolecular proportions of an alkyl hydrocarbon substituted phenol having 50 to 20,000 carbons in the alkyl group, formaldehyde and polyalkylene polyamine of the formula:

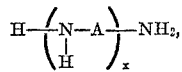

wherein A is a divalent saturated aliphatic hydrocarbon group of from 2 to 8 carbon atoms and $x$ is an integer of from 1 to 10, at a temperature in the range of 120 to 200° F., and a second step reaction at 120 to 350° F. between the product of said first step reaction and for each mole thereof 0.5 to 1.0 mole formaldehyde while removing by-product water.

2. The method of claim 1 wherein tetraethylene pentamine is the polyalkylene polyamine reactant and an alkyl phenol of number average molecular weight of from 800 to 2500 as the alkyl hydrocarbon substituted phenol reactant.

References Cited
UNITED STATES PATENTS

| 2,352,796 | 7/1944 | McLeod | 260—2 |
| 3,036,003 | 5/1962 | Verdol | 252—33.4 |

FOREIGN PATENTS 506,587  10/1954  Canada.

ROBERT V. HINES, Primary Examiner

U.S. Cl. X.R.

260—462, 552, 553; 252—33.4, 42.7, 51.5

PO-1050
(5/69)

UNITED STATES PATENT OFFICE
CERTIFICATE OF CORRECTION

Patent No. 3,539,633      Dated NOVEMBER 10, 1970

Inventor(s) EDMUND J. PIASEK and ROBERT E. KARLL

It is certified that error appears in the above-identified patent and that said Letters Patent are hereby corrected as shown below:

Column 1, line 42: "obtained reacting" should be -- obtained by reacti

Column 2, line 22: "F. In" ("In" should not start a new sentence but be in the lower case) -- F. in --

Column 3, line 57: "results" should be singular

Column 3, line 58: "rating" should be plural

Column 4, line 17: "250 and 350°F." should read -- 250 to 350°F. --

Column 5, line 53: After "(c.f.h." parenthesis should be closed

Column 10, line 21: "formula-" should be -- formulation --

Column 10, line 36: "(0.32 mole)" should read -- (0.392) --

Column 10, line 52: "nitrogen" should be plural

Column 10, line 66: "oxyquen" should be -- oxygen --

Column 12, line 60: "in" should read -- into --

Column 13, line 28: Following "there are present two" -- moieties" was

Column 13, line 61: "hereinafter" is misspelled

SIGNED AND
SEALED
MAR 9 1971

(SEAL)
Attest:

Edward M. Fletcher, Jr.
Attesting Officer

WILLIAM E. SCHUYLER, JR
Commissioner of Patents